United States Patent

[11] 3,571,887

| [72] | Inventor | Daryl C. McIntire<br>Seymour, Iowa 52590 |
|---|---|---|
| [21] | Appl. No. | 811,358 |
| [22] | Filed | Mar. 28, 1969 |
| [45] | Patented | Mar. 23, 1971 |

[54] WHEEL MOVING TOOL
7 Claims, 4 Drawing Figs.

[52] U.S. Cl........................................................ 29/200,
29/256
[51] Int. Cl.................................................. B23p 19/00
[50] Field of Search........................................ 29/200 (P),
244, 251, 257, 256, 259, 258

[56] References Cited
UNITED STATES PATENTS

| 1,426,835 | 8/1922 | Mohrman.................... | 29/259 |
| 2,075,792 | 4/1937 | Curtiss....................... | 29/257 |
| 2,872,728 | 2/1959 | Fraser........................ | 29/256 |

*Primary Examiner*—Frank T. Yost
*Attorney*—Zarley, McKee & Thomte

ABSTRACT: A device having a frame detachably connected to the outer end of a tractor axle and a rod extending threadably through a support portion wherein a threaded bolt is connected to the rod by a swivel coupling such that the rod may be threaded inwardly or outwardly and the wheel will be moved in the same respective directions upon the bolt being threadably engaged with the wheel. The bolt may include an exposed head for engaging and disengaging it with the wheel.

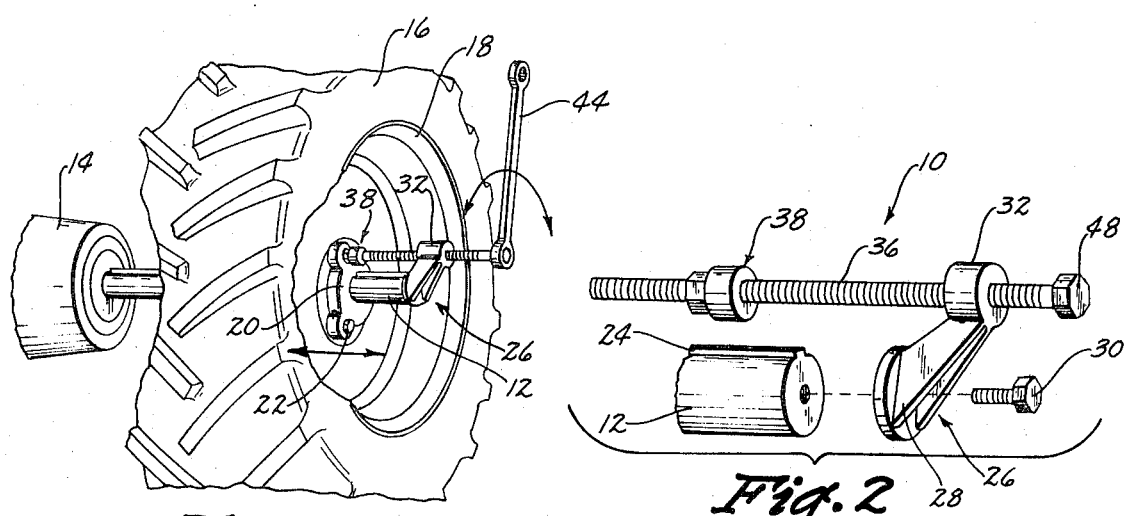
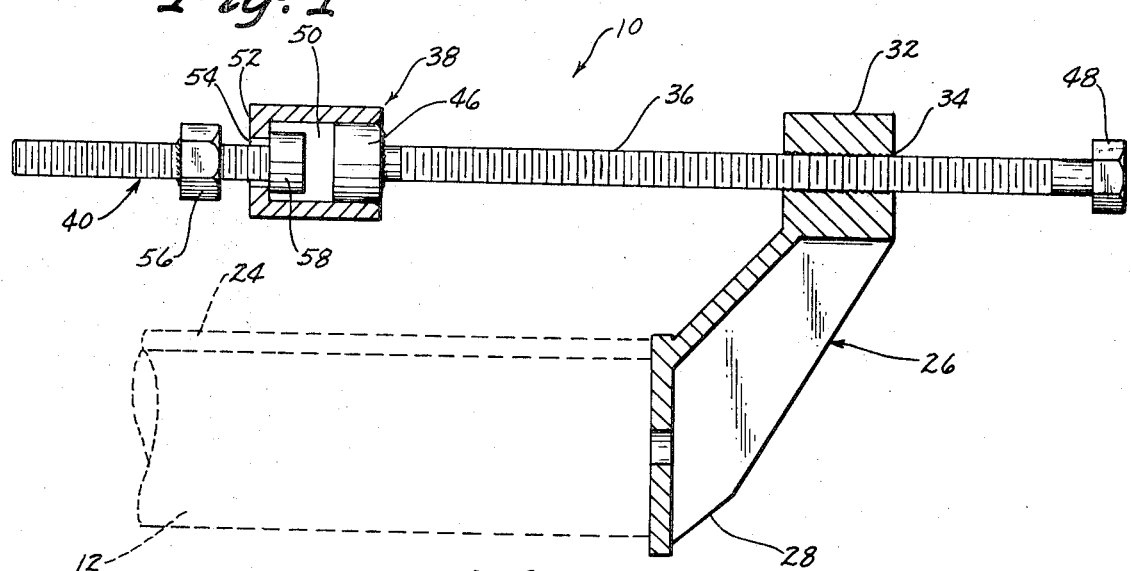
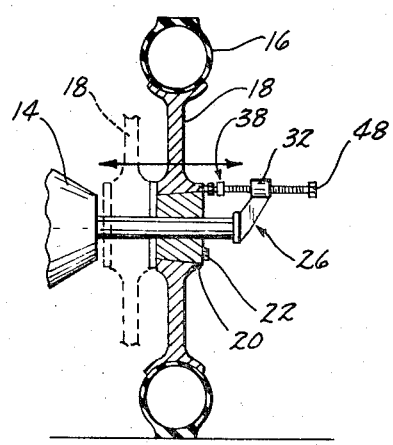
INVENTOR
DARYL C. McINTIRE
BY
Zarley, McKee + Thomte
ATTORNEYS

WHEEL MOVING TOOL

The different uses made of farm tractors requires the wheels to be moved inwardly and outwardly frequently and this can become an extremely difficult if not impossible job for the operator of the tractor without the use of complicated expensive equipment or the help of several additional people.

The wheel moving tool of this invention is extremely simple in construction and in its operation and furthermore permits moving of the wheel by a single person. The tool may be easily attached to the axle of the wheel and the hub and similarly may be easily removed.

An elongated rod rotatable by use of a hand wrench is connected through a swivel coupling to a bolt which in turn is threadably connected to the tractor wheel such that turning the bolt inwardly will move the wheel inwardly and turning the bolt outwardly will accordingly pull the wheel outwardly on the tractor axle.

These and other features and advantages of this invention will become readily apparent to those skilled in the art upon reference to the following description when taken into consideration with the accompanying drawings, wherein:

FIG. 1 is a fragmentary perspective view of the wheel moving tool mounted on the axle of a tractor and in engagement with the tractor wheel;

FIG. 2 is an enlarged perspective view of the wheel moving tool only in exploded relationship to the end of the tractor wheel;

FIG. 3 is an enlarged longitudinal cross-sectional view of the wheel moving tool on a tractor axle; and FIG. 4 is a cross-sectional view of the wheel showing the wheel moving tool connected to the axle and the wheel.

The tool moving device of this invention is referred to generally in FIG. 2 by the reference numeral 10 and is shown in FIG. 1 mounted on an axle 12 of a tractor 14. A rubber tire 16 is mounted on a wheel 18 and is secured in place on the axle 12 by a lock-type bushing 20. Three bolts 22 connect the bushing 20 to the wheel 18.

A key 24 is provided on the axle 12 for locking engagement with the bushing 20.

The wheel moving tool includes a frame 26 having a base portion 28 adapted to be secured to the outer end of the axle 12 by a threaded bolt 30. A rod support portion 32 having a threaded longitudinal opening 34 extending therethrough is mounted longitudinally outwardly of the end of the wheel axle 12 and is offset therefrom as seen in FIG. 3.

A threaded rod 36 extends through the threaded opening 34 in the rods 32 and terminates at its inner end in a coupling 38 which swivelly engages a threaded bolt 40. The rod 36 is provided with a head 42 for engagement by a wrench 44 such that the rod 36 may be moved inwardly and outwardly in the threaded opening 34 of the rod support portion 32.

The coupling 38 is rigidly welded to an enlarged head portion 46 on the inner end of the rod 36 and the head portion 46 defines one end of a chamber 50. The opposite end 52 of the chamber includes an opening 54 extending therethrough. The bolt 40 has a first head 56 and a second head 58 spaced outwardly therefrom and disposed in the chamber 50. It is seen that limited longitudinal movement of the bolt 40 is permitted between the heads 56 and 58 or if the space therebetween is sufficient the head 58 may engage the head 46 on the bolt 36 to limit the movement of the bolt 40 toward the rod 36.

The opening 54 is large enough to permit slight angular movement of the bolt 40 relative to the longitudinal axis of the rod 36. It is obviously seen that the bolt 36 may be rotated independently of the bolt 40 and conversely the bolt 40 may be rotated independently of the rod 36.

In operation, the base portion 28 of the frame 26 is bolted flush against the outer end of the axle 12 and is secured thereto by the bolt 30 to hold the frame stationary relative to the axle 12. Next one of the bushing bolts 22 is removed and the bolt 40 is threaded into the threaded opening occupied by the bushing bolt 22 that was removed. The head 56 makes it convenient to rotate the bolt 40 with a conventional wrench. The other bushing bolts 22 are loosened so that the wheel is free to move. Finally, the rod 36 is turned inwardly to move the wheel 18 inwardly and is turned outwardly to move it outwardly. A wrench 44 is used to turn the rod 36 and as the rod is turned the swivel coupling 38 permits independent rotation of the rod 36 relative to the bolt 40 and thus the wheel may be pushed inwardly or pulled outwardly through the coupling 38 and the bolt 40. When the wheel is pushed inwardly the head 46 on the inner end of the rod 36 engages the head 58 on the bolt 40 in the chamber 50. When the wheel is being moved outwardly the head 58 engages the inner end of the chamber 50 and the swivel coupling pulls the bolt 40 outwardly thereby moving the wheel 18 outwardly on the axle 12.

It is seen that the freedom of movement of the bolt 40 due to the size of the opening 54 and the size of the chamber 50 in the coupling 38 permits necessary adjustment and alignment of the bolt 40 for readily engaging the threaded opening in the bushing 20 and the wheel 18. Similarly during operation of the wheel moving device when the rod 36 is being turned there is no damaging binding that will occur.

Once the wheel has been moved to its desired location the bolt 40 is turned outwardly and thus removed from the bushing 20 and the permanent bushing bolt 22 is returned. The bushing bolts 22 are then tightened and the wheel 18 is then locked in place on the axle 12.

Some changes may be made in the construction and arrangement of my Wheel Moving Tool without departing from the real spirit and purpose of my invention, and it is my intention to cover by my claims, any modified forms of structure or use of mechanical equivalents which may be reasonably included within their scope.

I claim:

1. A wheel moving tool for moving wheels on tractors or the like:

a frame member having a base adapted to be secured to the outer end of the wheel axle;

a rod support portion on said frame member offset from said base;

a rod means movably secured in said rod support;

a bolt element rotatably connected to said rod means and being adapted to engage a tractor wheel; and means on said rod for moving said rod and bolt alternately in and out relative to said frame whereby a tractor wheel may be moved in or out on an axle.

2. The structure of claim 1 wherein said rod is threadably connected to said rod support portion, a coupling means interconnects said rod with said bolt and said bolt and rod are limited against more than a predetermined amount of longitudinal movement.

3. The structure of claim 2 wherein said bolt includes a threaded bolt portion for threadable engagement with a tractor wheel.

4. The structure of claim 3 wherein said bolts means includes a head means for engagement by a wrenchlike tool to turn said bolt independently of said rod into and out of engagement with a tractor wheel.

5. The structure of claim 3 wherein said coupling means is capable of permitting a predetermined amount of angular movement between said bolt means and said rod relative to the longitudinal axis of each.

6. The structure of claim 4 wherein said bolt means includes a second head outwardly of said first head means and said coupling has a chamber and an opening extending outside thereof, said second head being disposed in said chamber with said bolt portion extending through an opening in said chamber, and said opening being small enough to retain said second head in said chamber.

7. The structure of claim 1 wherein said rod is threadably connected to said rod support and a coupling means is provided on the inner end of said rod, said coupling means has a chamber with an opening in communication with the outside, said bolt element includes a threaded bolt portion for threadably engaging a tractor wheel and first and second head portions on the outer end thereof, said second head portion being disposed in said chamber with said bolt portion extending through said opening, said opening being small enough to retain said second head portion in said chamber, said chamber and opening being large enough to permit a predetermined amount of relative rotational and longitudinal angular movement between said bolt element and said rod, and said chamber having means at opposite ends for limiting relative longitudinal movement of said bolt whereby upon turning said rod inwardly a tractor wheel will be moved inwardly and by turning said rod outwardly a tractor wheel will be moved.